United States Patent [19]
Ruiz et al.

[11] Patent Number: 5,570,213
[45] Date of Patent: Oct. 29, 1996

[54] LIQUID CRYSTAL LIGHT VALVE WITH MINIMIZED DOUBLE REFLECTION

[75] Inventors: Javier A. Ruiz, Oceanside; Rodney D. Sterling, Carlsbad, both of Calif.

[73] Assignee: Hughes-JVC Technology Corporation, Carlsbad, Calif.

[21] Appl. No.: 240,541

[22] Filed: May 10, 1994

Related U.S. Application Data

[63] Continuation of Ser. No. 963,612, Oct. 20, 1992, abandoned.

[51] Int. Cl.$^6$ ............................ G02F 1/135; G02F 1/1335
[52] U.S. Cl. ................................ 359/72; 359/66; 359/71; 359/48; 359/585; 359/586; 359/589
[58] Field of Search ................................ 359/70, 48, 71, 359/72, 74, 79, 586, 585, 589, 588, 580, 601, 609, 247, 254, 256

[56] References Cited

U.S. PATENT DOCUMENTS

| | | | |
|---|---|---|---|
| 3,432,225 | 3/1969 | Rock | 359/588 |
| 3,736,047 | 5/1973 | Gelber et al. | 359/74 |
| 4,114,983 | 9/1978 | Maffitt et al. | 359/580 |
| 4,127,322 | 11/1978 | Jacobson et al. | 353/31 |
| 4,191,456 | 3/1980 | Hong et al. | 353/31 |
| 4,343,535 | 8/1982 | Bleha, Jr. | 350/342 |
| 4,408,837 | 10/1983 | Kozaki et al. | 359/74 |
| 4,505,547 | 3/1985 | Sekimura | 359/74 |
| 4,521,079 | 6/1985 | Leenshouts et al. | 359/74 |
| 4,529,272 | 7/1985 | Kruger et al. | 359/74 |
| 4,650,286 | 3/1987 | Koda et al. | 350/331 R |
| 4,799,773 | 1/1989 | Sterling | 359/72 |
| 5,056,895 | 10/1991 | Kahn | 359/74 |
| 5,148,298 | 9/1992 | Shigeta et al. | 359/72 |
| 5,220,181 | 6/1993 | Kanai et al. | 257/449 |
| 5,225,920 | 7/1993 | Kasazumi et al. | 359/74 |
| 5,394,204 | 2/1995 | Shigeta et al. | 353/31 |

FOREIGN PATENT DOCUMENTS

| | | | |
|---|---|---|---|
| 59-202435 | 11/1984 | Japan | 359/74 |
| 2-239201 | 9/1990 | Japan | 359/619 |

OTHER PUBLICATIONS

Egerton et al "Optical Filters for Displays" Information Display–Nov. 1990–pp. 6–9.
Kiebling et al "An Incoherent-to-Coherent Optical Image Converter and Its Application in Hybrid Optical Processors" Jun. 1979–pp. 16–24.
G. Paul Montgomery, Jr. "Optical Properties of a Liquid-Crystal Image Transducer at Normal Incidence: Mathematical Analysis and Application to the Off State" J. Opt. Soc. Am., vol. 70, No. 3, Mar. 1980–pp. 287–300.
Reif et al "Hybrid Liquid Crystal Light Valve Image Tube Devices for Optical Processing" SPIE–vol. 83–Optical Information Processing–Aug. 1976–pp. 34–43.
Grinberg et al "A New Real-Time Non-Coherent to Coherent Light Image Converter" The Hybrid Field-Effect Liquid Crystal Valve Optical Engineering–vol. 14–No. 3–May–Jun. 1975–pp. 217–214.

Primary Examiner—William L. Sikes
Assistant Examiner—Tai V. Duong
Attorney, Agent, or Firm—Harness, Dickey & Pierce, P.L.C.

[57] ABSTRACT

A reflective liquid crystal light valve includes transparent conductive layers of indium tin oxide (30) employed as an electrode to electrically modulate orientation of molecules of a liquid crystal material that receives a high intensity reading light (40) applied through the transparent electrode. Unwanted double reflection (64,66) from interfaces between the indium tin oxide electrode (30) and adjacent layers (22,32) are minimized by application of broad band anti-reflective coatings (70,72,74,76) formed by one or more pairs of thin layers having alternately high and low indices of refraction.

22 Claims, 3 Drawing Sheets

LIQUID CRYSTAL LIGHT VALVE WITH MINIMIZED DOUBLE REFLECTION

This is a continuation of U.S. patent application Ser. No. 07/963,612 filed Oct. 20, 1992, now abandoned.

BACKGROUND OF THE INVENTION

1. Field of the Invention

The present invention relates to reflective liquid crystal light valve systems and more particularly concerns transmission of light through certain layers of a multi-layer liquid crystal device.

2. Description of Related Art

The reflective liquid crystal light valve (LCLV) is a thin film multi-layer structure comprising a liquid crystal layer, alignment layers, a dielectric mirror layer, a light blocking layer and photosensitive layer, all sandwiched between two transparent electrically conductive electrode layers. In a typical reflective liquid crystal light valve projection system a high intensity polarized illumination or reading beam is directed through a quartz input window and through the liquid crystal layer to the dielectric mirror. In an optically addressed reflective liquid crystal light valve, an input image of low intensity writing light, such as that generated by a cathode ray tube, is applied to the photosensitive layer, thereby switching the electric field across the electrodes from the photosensitive layer onto to the liquid crystal layer so as to selectively activate the liquid crystal according to the intensity of input writing light received at different areas of the photosensitive layer. Linearly polarized illumination light from a high power light source, such as a xenon lamp, passes through the quartz input window, through one transparent electrode and through the liquid crystal layer and adjacent alignment layers to be reflected from the dielectric mirror. Light reflected from the mirror is polarization modulated by the liquid crystal in accordance with the spatial pattern of writing light information incident on the photoresponsive layer. Therefore, if a complex distribution of light, for example a high resolution low intensity input image from a cathode ray tube, is focused onto the photosensitive layer surface, the liquid crystal light valve converts the low intensity input image into a replica image which can be reflected for projection with magnification to produce a high brightness image on a viewing screen. Projection systems of this type are described in several U.S. Patents, including U.S. Pat. No. 4,650,286 to Koda et al for Liquid Crystal Light Valve Color Projector, U.S. Pat. No. 4,343,535 to Bleha, Jr. for Liquid Crystal Light Valve, U.S. Pat. No. 4,127,322 to Jacobsen, et al for High Brightness Full Color Image Light Valve Projection System, and U.S. Pat. No. 4,191,456 to Hong, et al for Optical Block for High Brightness Full Color Video Projection System.

In some reflective liquid crystal light valves an array of thin film transistors incorporated in the mirror acts as the image input. The transistors are selectively actuated to block the high intensity reading light in a selected spatial pattern which causes the liquid crystal material to change the polarization of the reflected high intensity reading light in a like spatial pattern.

Many reflective liquid crystal light valve systems, particularly those having high intensity reading light with a line spectral content, or quasi monochromatic light as well as highly monochromatic light (e.g. from a laser), exhibit highly undesirable interference fringes in the output of the projection system. The interference fringes are considerably less of a problem, being less prominent, when the reading illumination source is in the form of a broadband source, such as a xenon arc lamp. Accordingly, xenon arc lamps are commonly used as the illumination source in liquid crystal light valve projectors. However, these lamps have a number of disadvantages when compared with metal halide lamps. Xenon arc lamps are inefficient, they create safety hazards, have short life times, and require large power supplies. Moreover, the xenon arc lamp produces much of its output in the infrared spectrum, thereby producing less useful light and more undesired heat. Thus they are less efficient. In some arrangements intensity of the illumination source is limited by allowable temperatures of the liquid crystal light valve device.

A metal halide lamp, such as a mercury lamp for example, provides more light with less heat, as compared to a xenon lamp, and is preferable to the xenon arc lamp in many other respects. However, light produced by the metal halide lamp is less broadband than that of the xenon arc lamp and provides illumination in the form of a line spectrum. The light output of such lamps, in other words, is concentrated in relatively narrow bands of different wavelengths. This line spectrum output of the metal halide lamp greatly exacerbates the appearance of interference fringes.

Some liquid crystal light valves are employed in optical data processing applications where the reading illumination source is a laser. Because of the very narrow bandwidth of laser light, interference fringes become much more visible. In an attempt to minimize such interference fringes, where the light source is a laser, the system uses a liquid crystal light valve with exceedingly tight tolerances on the thickness of the liquid crystal layer. With presently available manufacturing techniques, only a small percentage of the manufactured devices can meet such tolerances. This results in a very low yield operation that dramatically increases light valve costs.

Accordingly, it is an object of the present invention to provide a reflective liquid crystal light valve system that avoids or minimizes above mentioned problems.

SUMMARY OF THE INVENTION

In carrying out principles of the present invention in accordance with a preferred embodiment thereof, reflective liquid crystal light valve apparatus comprising a layer of liquid crystal material interposed between a layer of transparent conductive material (electrode) and a reflective layer is adapted to receive reading illumination light transmitted through the transparent conductive and liquid crystal layers to the reflective layer to be reflected back through the liquid crystal and transparent conductive layers. Means are provided for decreasing reflection of light from the interfaces between the transparent conductive layer and its adjacent layers. According to a particular feature of the invention, for a reflective liquid crystal light valve where the conductive transparent layer is tin oxide or indium tin oxide, a broadband writing light source may be employed with minimized interference fringes and enhanced efficiency by providing the transparent conductive layer with suitable anti-reflective coatings. Broadband anti-reflection is achieved by employing one or more pairs of relatively thin coatings of alternately high and low index of refraction.

By use of pairs of anti-reflective coatings of different indices of refraction and the resulting decrease of interference fringes, reflective liquid crystal light valves using a broadband illumination source may be constructed with thicknesses of liquid crystal materials having normal tolerances, thereby greatly decreasing costs.

A still further advantage is an improvement in the liquid crystal light valve's overall efficiency. This is accomplished by the reduction of the undesired reflections at the interface between the transparent conductive electrode and the quartz window of the device and at the interface between the transparent conductive electrode and the liquid crystal layer. Thus the present invention allows the use of simpler, less costly and more desirable light sources, less costly manufacturing techniques and improves overall efficiency.

DESCRIPTION OF THE PREFACED EMBODIMENTS

Figure 1:
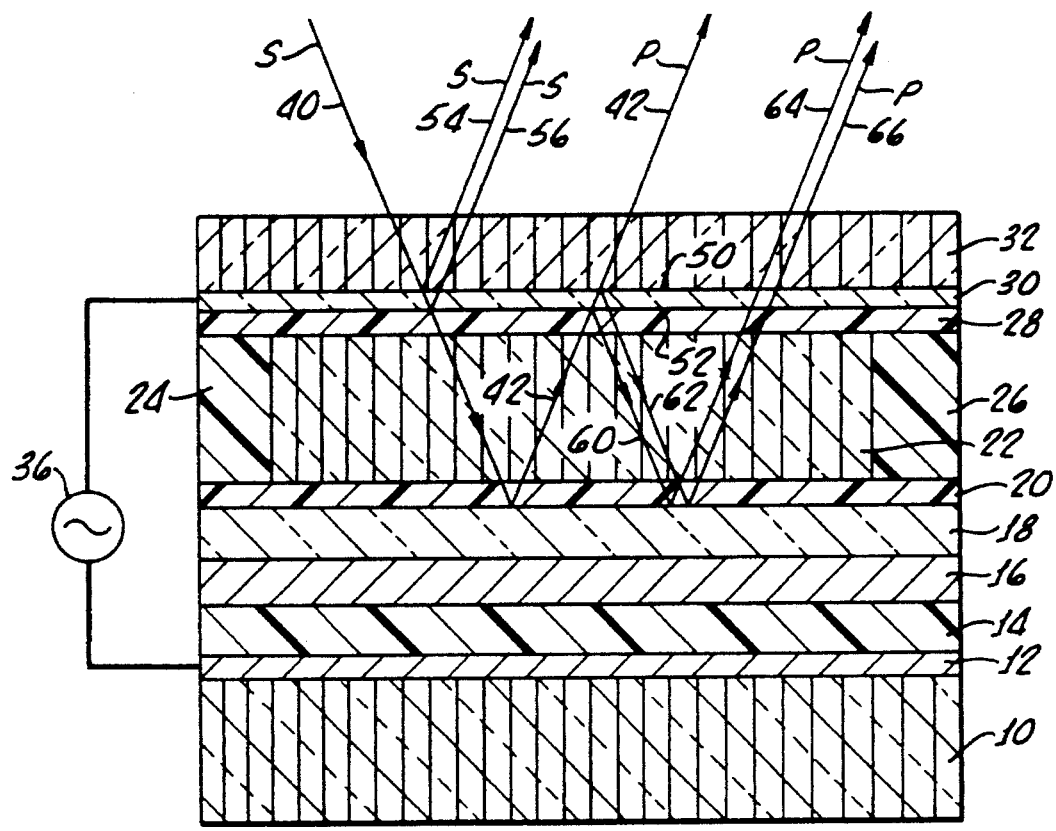
FIG. 1 is a simplified schematic illustration of the multi-layer structure of a reflective liquid crystal light valve of the prior art, to which the principles of the present invention may be applied, showing undesired double reflection.

Illustrated in FIG. 1, for purposes of exposition, is a schematic cross-section of a typical amorphous silicon liquid crystal light valve (LCLV) of the prior art. The LCLV is a multi-layer structure composed of a stack of dielectric materials of various electrical resistivities, thicknesses and indices of refraction. From the bottom to the top of the cross-section illustrated in FIG. 1, the multi-layer structure includes an input structure 10 which may be a fiber optic face plate to which input (writing) light is provided by a cathode ray tube (not shown), a transparent conductive primary electrode 12 of indium tin oxide or tin oxide, for example, a photosensitive layer 14 of amorphous silicon, for example, a light blocking or light absorbing layer 16 of cadmium telluride, a dielectric mirror 18 of alternating layers of silicon dioxide and titanium dioxide, a first liquid crystal alignment film 20 of silicon dioxide, a nematic liquid crystal material 22 confined between peripheral spacer pads 24,26, a second liquid crystal alignment film 28 of silicon dioxide, a transparent conductive counter-electrode 30 of indium oxide or tin oxide, and an output quartz or fused silica window 32. Bonding layers (not shown) of cadmium telluride and silicon dioxide are provided between layers 14 and 16 and between layers 16 and 18 for proper adherence of these layers. Typical thicknesses of materials in an exemplary LCLV are as follows: the amorphous silicon photosensor layer 30 micrometers, the cadmium telluride blocking layer 2.2 micrometers, the dielectric mirror 1.6 micrometers, the liquid crystal layer 4 micrometers, and each silicon dioxide alignment film 0.15 micrometers. The several layers on each side of the liquid crystal may be coated directly upon the fused silica windows or the fiber optic face plate, whereby the window or face plate effectively provides a substrate for other layers including the indium tin oxide electrode.

The light valve is provided with an audio frequency voltage signal from a source 36 connected to the primary and counter-electrodes 12 and 30, which establishes an alternating current across the multi-layer structure. This voltage is typically adjusted to the voltage at which the liquid crystal layer is at its threshold. The optically addressed light valve is provided with a varying optical input of relatively low intensity in the form of writing light from the fiber optic face plate or input window 10 via a cathode ray tube (not shown). The writing light is applied through the transparent conductive primary electrode 12 to the photosensitive layer 14, which generates a DC voltage according to intensity of light received at different areas thereof and reduces the AC impedance of the layer, causing an increase in the AC voltage dropped on the liquid crystal layer. With application of the voltage from the photosensitive layer the audio frequency induced voltage is augmented, and a voltage above its threshold is applied to the liquid crystal, which changes orientation of its molecules. This changed orientation causes the polarization state of reading light passing through and reflected at the liquid crystal layer to be changed at different areas according to the spatial pattern of voltage produced by the photosensitive layer. A high intensity reading light of a single polarization state, such as S state for example, is applied through the window 32, through the various layers, including the nematic liquid crystal layer, to be reflected from dielectric mirror 18 back through the liquid crystal to produce an output optical image.

For those areas of the liquid crystal that receive input or writing light, e.g. light areas of the liquid crystal, the polarization state of the reflected light is changed from S to P so that the device reflects light of polarization state P in a spatial pattern that is determined by the spatial pattern of the input writing light applied from the input writing source. For those areas of the liquid crystal that are not excited by input writing light, the reflected light has the same polarization state, namely polarization state S, of the incoming or illumination light, which is readily distinguished from the light of polarization state P by use of a suitable device, such as a polarization analyzer (not shown) for example. Thus, a high intensity optical image of the writing light pattern is produced for display.

As illustrated in FIG. 1, input writing light of a single polarization state, such as polarization state S for example, is directed to the device in a beam indicated at 40 and is transmitted through the input window 32, the transparent electrode 30, the alignment layer 28, the liquid crystal material 22, and the second alignment layer 20 to the mirror 18, where it is reflected along a path 42, with a P polarization state for the active or light areas of the liquid crystal material. The light reflected along path 42 represents the light that defines the image that is to be projected by the device. This light has a P polarization state, which is selected for projection in this apparatus.

Figure 2:
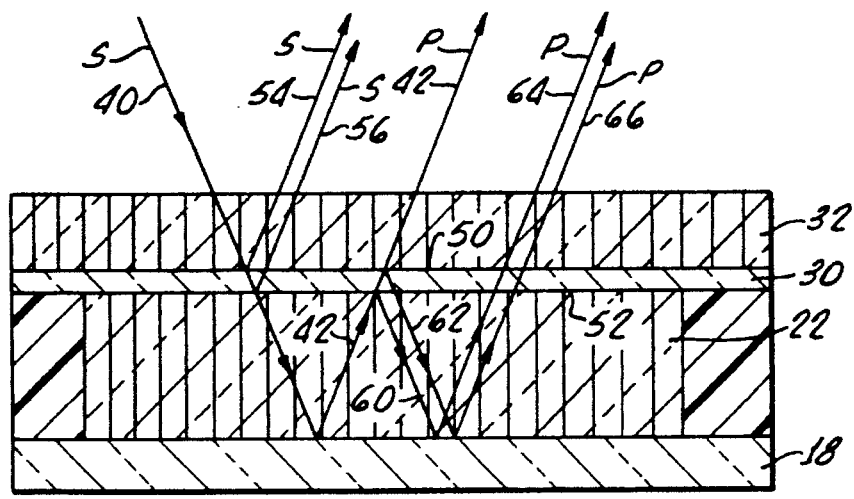
FIG. 2 schematically illustrates details of a simplified arrangement of the layers of the reflective liquid crystal light valve of FIG. 1, showing the undesired double reflections of the prior art.

Certain secondary reflections also occur because of the difference of indices of refraction of the various materials employed. Typically, the counter-electrode layer 30 of indium tin oxide has an index of refraction which varies anywhere between 1.85 and 2.1, depending on the deposition process by which it is applied. The liquid crystal material typically has an index of refraction of 1.49. The alignment layers are special silicon dioxide layers having an index of refraction of 1.46. Because the indices of the silicon dioxide alignment layer 20 and the index of refraction of the liquid crystal layer 22 are so close, for purposes of this discussion the silicon dioxide alignment layers can be treated simply as extensions of the liquid crystal layer. This treatment is used in the simplified showing of FIG. 2, from which the alignment layers have been omitted. The input window 32 is fused silica and has an index of refraction of approximately 1.52. Because of the index mismatches that exist between the transparent conductive indium tin oxide layer 30 and layers on either side, there will be some amount of secondary reflection. Thus, there is a first interface 50 between the indium tin oxide electrode 30 and the fused silica window 32, at which there is a mismatch of the indices of refraction. There is also a second interface 52 between the other surface of the indium tin oxide electrode 30 and the combined liquid crystal material and alignment layers 22,28 (shown in FIG. 2 merely as a layer 22). The mismatched indices of refraction at interfaces 50 and 52 cause some of the incoming light along path 40 to be reflected along paths 54 and 56 from the interfaces 50 and 52, respectively. However, since the light reflected on paths 54 and 56 still has the incoming polarization state S, which is effectively eliminated from the system output, this light has substantially little or no effect on the main information bearing beam on path 42, which has a polarization state P. As previously mentioned, the projection system projects only light of P polarization state. Nevertheless, the reflection of light on paths 54,56 does introduce some loss of efficiency.

The incoming light of polarization state S, which is reflected from the mirror and travels back through the liquid crystal material with a polarization state P, is also partially reflected from the interfaces 50 and 52 along paths indicated at 60 and 62, respectively. Light in paths 60 and 62 is directed back through the liquid crystal material to be reflected a second time from the mirror 18 and exits along paths 64,66.

Where the secondarily reflected light on paths 60,62 impinges upon areas of the liquid crystal material that are dark, this light, which is of P polarization state, exits the device along paths 64 and 66, also with P polarization state (the unmodulated areas of the liquid crystal do not change the polarization state of incident light), and thus may interfere with the primary beam exiting along path 42. Where the P state light on path 60,62 impinges on modulated areas of the liquid crystal, it is reflected with S state. Interference fringes are produced by the secondary reflection of P state light. The resulting projected image is significantly degraded where the doubly reflected P polarized light on paths 64,66 interferes either constructively or destructively with the principal beam on path 42. Interference fringes caused by this double reflection are due, at least in part, to the fact that the thickness of the liquid crystal material cannot be made uniform over its entire area with adequate precision. In other words, the thickness of the liquid crystal layer varies over its area, and, therefore, the path length of the doubly reflected light along paths 60,62 and 64,66 varies over the area of the liquid crystal material to provide areas of constructive interference and areas of destructive interference, resulting in undesirable interference fringes that become visible in the output of the light valve.

As mentioned above, FIG. 2 provides a simplified showing of the optical paths and reflections described in connection FIG. 1, and shows the four effective layers that need be considered for an understanding of the creation of the interference fringes.

Figure 3:
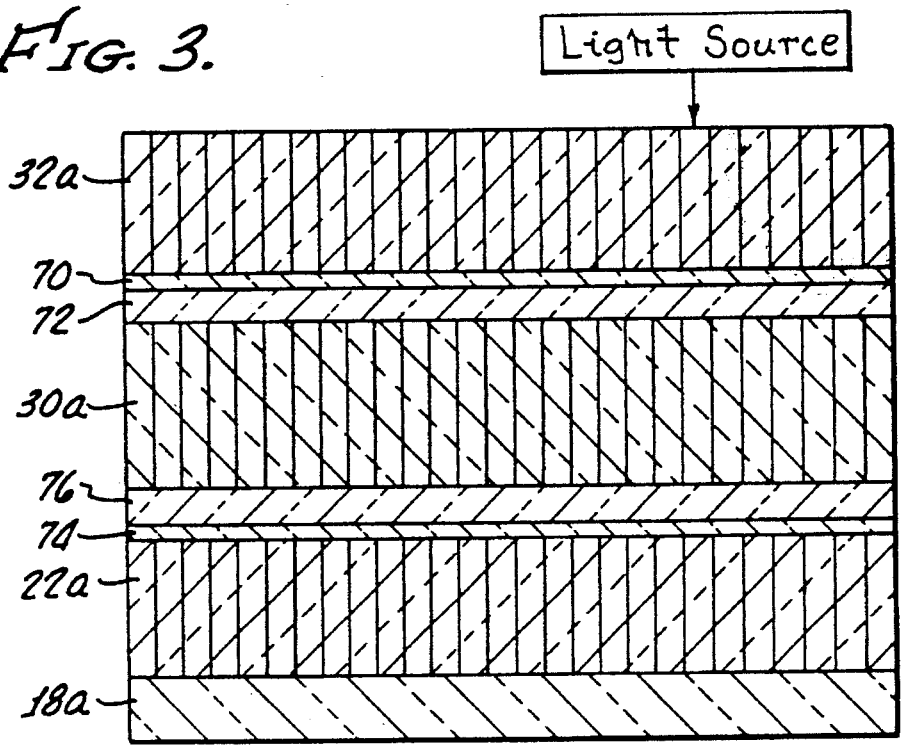
FIG. 3 illustrates the portion of the liquid crystal light valve which is shown in FIG. 2 but which has been modified by application of one arrangement of pairs of anti-reflection layers in accordance with principles of the present invention.

To correct the problem of production of interference fringes, a broadband anti-reflective coating is applied to both sides the indium tin oxide electrode layer 30 of the prior art device. One arrangement of layers of a coated indium tin oxide layer is illustrated in FIG. 3, which shows only part of the liquid crystal light valve corresponding to the parts shown in FIG. 2, but with added anti-reflective coating layers. In FIG. 3 there is shown the input fused silicon window 32a, corresponding to window 32 of FIGS. 1 and 2, mirror 18a, corresponding to mirror 18 of FIGS. 1 and 2, liquid crystal material 22a, corresponding to liquid crystal layer 22 of FIGS. 1 and 2, and the counter-electrode indium tin oxide layer 30a, corresponding to the electrode layer 30 of FIGS. 1 and 2. As in FIG. 2, the alignment layers are not separately illustrated. Because of the closeness of the indices of refraction of the liquid crystal material and the alignment layers, the alignment layers are treated as part of the liquid crystal layer.

As can be seen in FIG. 3, the indium tin oxide electrode 30a is coated on one side with a pair of mutually contiguous anti-reflective coatings 70 and 72, which are respectively positioned adjacent the fused silica window 32a and adjacent the indium tin oxide electrode layer 30a. Similarly, a pair of anti-reflective coatings or layers 74,76 are interposed between the other (lower as viewed in FIG. 3) side of the indium tin oxide electrode layer 30a and the adjacent or upper side of the liquid crystal layer 22a. Layer 76 is adjacent the indium tin oxide layer 30a and layer 74 is adjacent the liquid crystal layer 20a. The two anti-reflective layers 74,76, like the anti-reflective layers 70,72, are immediately adjacent to one another.

Preferably the layers of each pair of layers on either side of the indium tin oxide are of alternately high and low index of refraction. Consider the typical embodiment illustrated in FIG. 3, where the fused silicon window 32a has an index of refraction of 1.52, the indium tin oxide electrode 30a has an index of refraction of 1.776 and the liquid crystal material has an index of refraction of 1.49. The anti-reflection coating layers are selected as follows. Layer 70 is of titanium dioxide, which has a relatively high index of refraction of between 2.3 and 2.5, and layer 72 has a relatively low index of refraction, being formed of silicon dioxide having an index of refraction of between 1.38 and about 1.46. Silicon dioxide has an index of refraction of between 1.46 and 1.47. Similarly, the pair of anti-reflection layers 74,76 on the other side of the indium tin oxide electrode 30a are also formed of titanium dioxide for layer 74, having the relatively high index of refraction, and silicon dioxide or similar material for layer 76, having the relatively low index of refraction.

Thicknesses of the various layers are chosen as follows. The high index titanium dioxide layer 70 has a thickness of 0.158 QWT, where QWT is one-quarter of the wavelength of a reference wavelength, which in this case is 632.8 nm. The low index silicon dioxide layer 72 has a thickness of 0.342 QWT. The indium tin oxide electrode layer 30a, having a high index, has a thickness of 1.776 QWT. The second low index silicon dioxide layer 76 has a thickness of 0.320 QWT, and the second high index titanium dioxide layer 74 has a thickness of 0.152 QWT.

It has been found that pairs of these alternately high and low index of refraction of materials formed between the layers of significantly different indices, such as between the indium tin oxide layer 30a (1.776 index) and the layer of fused silicon 32 (1.46 index), provide broadband anti-reflection coatings, which are effectively applicable over the visible spectrum from somewhat over 400 nm to nearly 700 nm.

The arrangement illustrated in FIG. 3 has been employed in a reflective liquid crystal light valve using a metal halide lamp for the illumination source. The device successfully eliminated the visible fringe problem. In addition, visibility of fringes in the projected image of such a device when used with a monochromatic illumination source, such as a 6328 angstrom HeNe laser, was reduced to an acceptable level. Applicability of the invention for use in monochromatic applications, where the LCLV is used in a laser display optical data processing system, is significant. As previously mentioned, interference fringes become much more visible with highly monochromatic light of a laser. Previously, light valves for such application (a laser source of illumination) had to be constructed with very tight tolerances on the liquid crystal gap (e.g., uniformity of thickness of the liquid crystal layer) so that no fringes would appear. Required precision of uniformity of the liquid crystal gap in such applications dramatically increases the cost of prior valves. In a system employing a laser illumination light with the anti-reflection coatings described herein, the interference problem is solved so that the liquid crystal light valve may be constructed with a normal, more economically feasible tolerance.

Still another advantage of the described system is the increase in overall efficiency. Even though the reflection of light from interfaces 50 and 52 (see FIG. 2) is of S state polarization and will not cause interference fringes, this reflected light is lost to the system because it has not had its polarization state changed. The anti-reflection layers described herein greatly decrease this loss.

A significant advantage of the described anti-reflective coatings, as previously mentioned, is the fact that the effective elimination of interference fringes enables the use of broadband metal halide lamps in reflective mode liquid crystal projectors. In this type of high contrast reflective projector the interference problem is significant and is substantially eliminated by the described anti-coating reflections. Use of metal halide lamps in prior liquid crystal projectors has been limited to transmissive displays, where interference fringes are much less noticeable.

Many different designs and materials employing principles of the present invention may be implemented to reduce reflection from the electrode interfaces. The electrodes need not be indium tin oxide, but may be tin oxide or other equivalent materials. Other designs employing the indium tin oxide layer as the top layer will provide good results.

As a first example of one exemplary alternative design, the sequence of layers of Table I, below, from the fused silica substrate (window 32a) to the liquid crystal layer 22a may be employed. Table I lists the order of layers in the actual sequence of their positions between the window and liquid crystal, identifying the thickness of each layer in terms of the stated part of a quarter-wavelength, with a reference wavelength of 632 nm. Symbol I in the following table denotes indium tin oxide and symbol L denotes silicon dioxide.

TABLE I

| FUSED SILICA SUBSTRATE |
| --- |
| 0.1975 I |
| 0.31875 L |
| 1.743 I |
| 0.312 L |
| 0.199 I |
| LIQUID CRYSTAL |

Thus, for example, Table I specifies an arrangement wherein a relatively greater thickness of indium tin oxide (1.743I), having a thickness of 1.743 times a quarter of the 632 nm wavelength is effectively sandwiched between a pair of alternate low index (0.31875 L) and high index (0.1975 I) layers on one side of the central layer, and a similar pair of alternately low index (0.312 L) and high index (0.199 I) layers on the other side.

Figure 4:
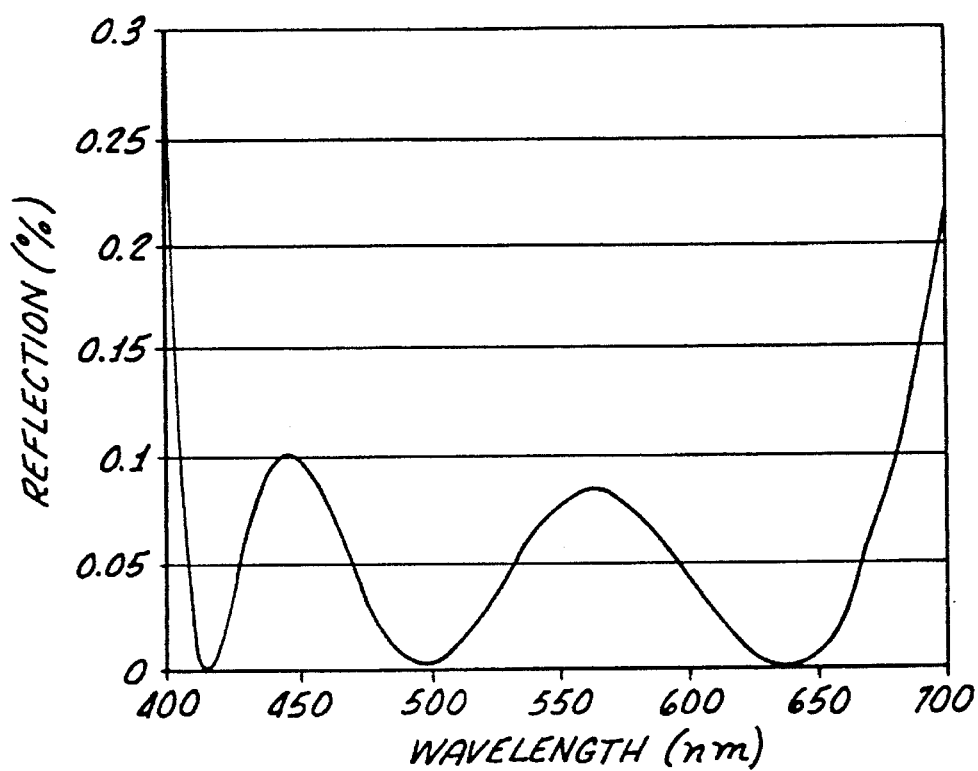
FIGS. 4, 5 and 6 graphically illustrate reflection characteristics of several different embodiments of the invention.

FIG. 4 shows a graph of the percentage of reflection against wavelength for a substrate of a liquid crystal light valve employing the anti-reflection coatings of the design set forth in Table I. This graph, and also the graphs of FIGS. 5 and 6 described below, is based upon reflection from only a substructure wherein light is transmitted (reflected) from the liquid crystal material 22a along paths 64,66 toward an electrode having a pair of anti-reflective coatings on both sides (the electrode has plural pairs of coatings for the graph of FIG. 6). The graph shows the very low reflection of light incident upon the coated electrode and coming from the liquid crystal layers. The curve illustrates very low reflection across the entire spectrum, from somewhat over 400 nm to well over 650 nm, peaking to a reflection percentage of only 0.1 at about 440 nm and to a reflection percentage of only about 0.8 at a wavelength slightly greater than 550 nm.

Materials other than silicon dioxide may be employed for the low index of refraction layer. Thus, for example, in a second alternative design set forth in Table II below, five layers are employed, as in the design of Table I, with alternate high and low index pairs of layers on either side of a relatively thicker centrally positioned layer of indium tin oxide. In Table II the reference character C denotes magnesium fluoride, and thicknesses are again referenced to a quarter of the 632 nm reference wavelength, so that, for example, the layer designated as 0.2556 C is a layer of magnesium fluoride (which has an index of refraction of about 1.38) having a thickness of 0.2556 times one quarter of the 632 nm wavelength. Again in Table II the reference character I denotes indium tin oxide.

TABLE II

| FUSED SILICA SUBSTRATE |
| --- |
| 0.2238 I |
| 0.2556 C |
| 1.78839 I |
| 0.24836 C |
| 0.2256 I |
| LIQUID CRYSTAL |

Figure 5:
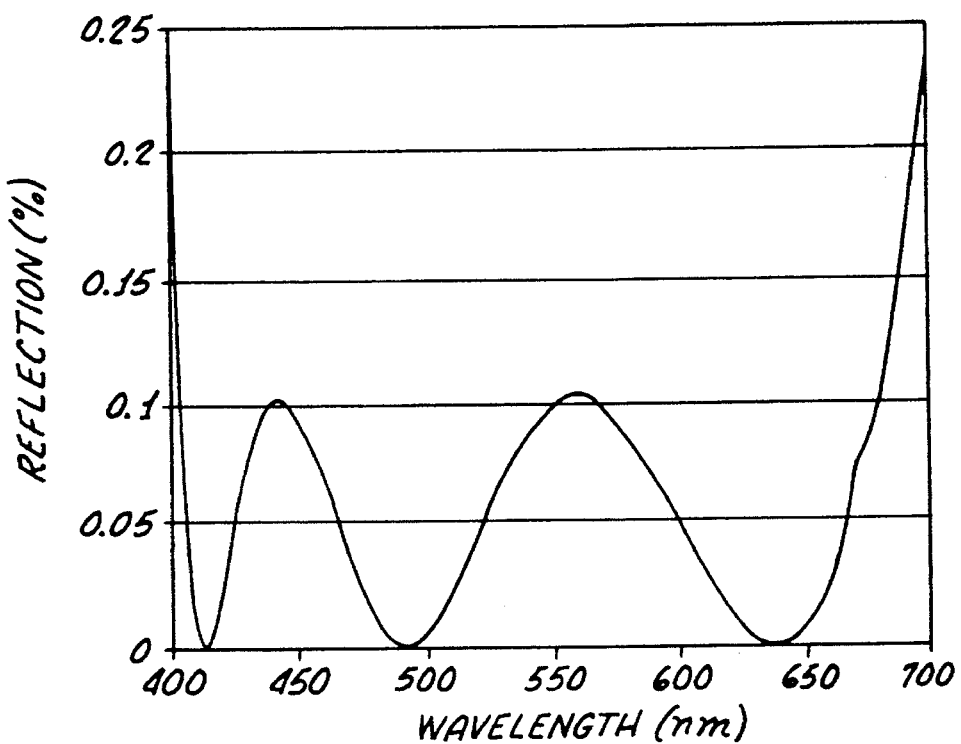

FIG. 5 is a graph showing reflectivity for a substructure design set forth in Table II, again showing good transmission over the entire visible spectrum, with but two peaks at roughly about 440 nm and 560 nm, both of which are just slightly greater than 0.1 percent reflection.

Figure 6:
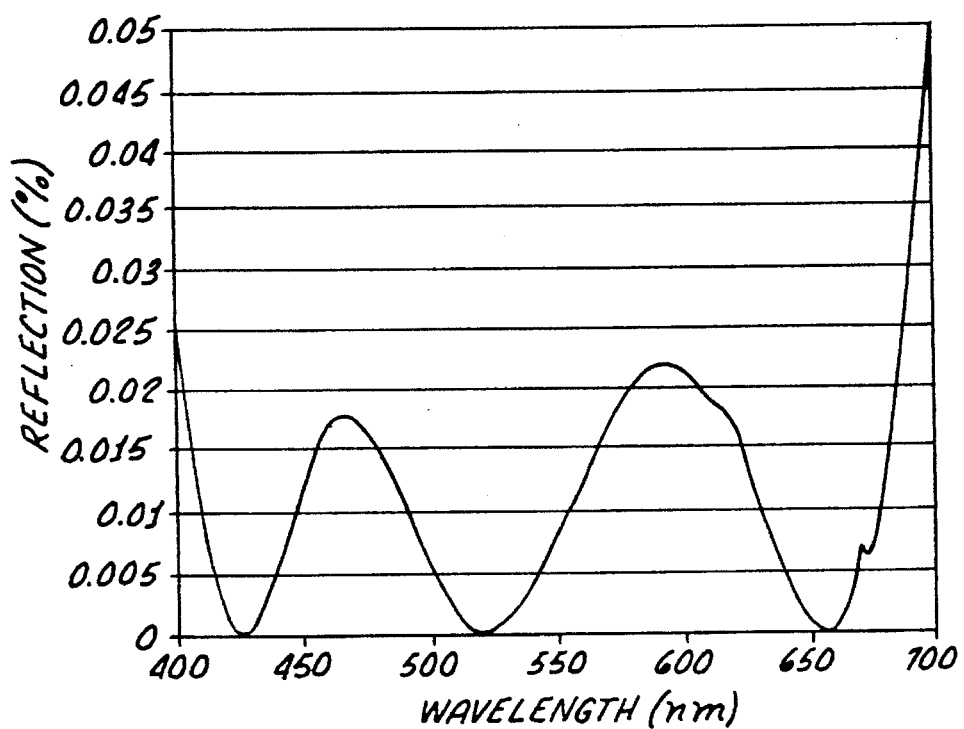

FIG. 6 is a graph of the reflection percentage of a substructure of a light valve having the design of Table III. FIG. 6 shows a significant increase in transmission and concomitant decrease in reflection accomplished with this design. Again there is little reflection over substantially the entire visible spectrum, with reflection peaks at approximate 460 nm and 590 nm. However, these peaks are many times less than those of the prior designs, the first peak of FIG. 6 showing a maximum reflection at the indicated wavelength of less than 0.02 percent and the second of less than 0.025 percent.

Still other designs may employ other than two pairs of alternately high and low index of refraction material. For example, Table III, below, represents a design wherein 21 layers are interposed between the fused silica window 32a and the liquid crystal 22a. In this design a central layer 1.34176 I of indium tin oxide, having a thickness of 1.34176 of a quarter of the 632 nm reference wavelength, is sandwiched between five pairs of alternately low and high index of refraction materials, denoted as L (silicon dioxide) and H (titanium dioxide). Table III sets forth the thickness and the order of the total of 21 layers between the fused silica and the liquid crystal in this design.

TABLE III

| FUSED SILICA SUBSTRATE |
| --- |
| 0.338 H |
| 0.3242 L |
| .05382 H |
| .136 L |
| .06325 H |
| .10014 L |
| .07393 H |
| .08849 L |
| .07505 H |
| .0671 L |
| 1.34176 I |
| .06626 H |
| .07896 L |
| .07305 H |
| .09762 L |
| .07405 H |
| .14383 L |
| .05026 H |
| .27659 L |
| .04387 H |
| LIQUID CRYSTAL INDEX OF REFRACTION |

Although liquid crystal material having a refractive index of 1.49 has been described in the exemplary embodiments disclosed herein, it will be readily appreciated that other liquid crystal materials having other indices of refraction may be employed with other designs having pairs of layers of alternately high and low indices of refraction.

The individual designs, that is, the choice of layer thicknesses of the several materials are selected by trial and error in conjunction with a computer optimization program.

What is claimed is:

1. In a reflective liquid crystal light valve apparatus including a window layer for receiving an incoming light beam, a transparent conductive layer, a reflective layer, a liquid crystal layer interposed between said reflective layer and said transparent conductive layer wherein said transparent conductive layer is interposed between said liquid crystal layer and said window layer, and a line spectrum light source for transmitting light through said window layer said transparent conductive layer and said liquid crystal layer to said reflective layer, to be reflected back through said liquid crystal layer, said transparent conductive layer, and said window layer wherein said reflective liquid crystal light valve apparatus has interference fringes at a first interface between said window layer and said transparent conductive layer and at a second interface between said transparent conductive layer and said liquid crystal layer, an improved reflective liquid crystal light valve apparatus comprising:

means, located between said window layer and said transparent conductive layer and between said transparent conductive layer and said liquid crystal layer, for decreasing reflection of light from said first and second interfaces to less than 0.3% for light having wavelengths from 400–700 nm.

2. The apparatus of claim 1 wherein said means for decreasing comprises first and second anti-reflective coatings adjacent one side of said transparent conductive layer and third and fourth anti-reflective coatings adjacent an opposite side.

3. The apparatus of claim 2 wherein said first and third anti-reflective coatings include a first layer having a high index of refraction and said second and fourth antireflective coatings include a second layer having a low index of refraction.

4. The apparatus of claim 1 wherein said means for decreasing comprises a plurality of pairs of anti-reflection layers interposed between said transparent conductive layer said window layer and between said transparent conductive layer and said liquid crystal layer, and wherein a first layer of each pair has an index of refraction that is greater than the index of refraction of the second layer of the same pair.

5. The apparatus of claim 1 wherein said means for decreasing reflection reduces reflection to less than 0.2% for light having wavelengths from 410–680 nm.

6. In a reflective liquid crystal light valve apparatus including a transparent conductive counter-electrode, a dielectric mirror, a first alignment film, a liquid crystal material, a second alignment film, and a window layer, an improved reflective liquid crystal light valve comprising:

means located adjacent opposite sides of said transparent conductive counter-electrode, for minimizing reflection of light from interfaces between said window layer and said transparent conductive counter-electrode and between said transparent conductive counter-electrode and said first alignment film to less than 0.3% for light having wavelengths from 400–700 nm.

7. The reflective liquid crystal light valve of claim 6 wherein said transparent conductive counter-electrode includes a layer of indium tin oxide, wherein opposite sides thereof are coated with silicon dioxide.

8. The reflective liquid crystal light valve of claim 6 wherein said transparent conductive counter-electrode includes a layer of indium tin oxide, wherein opposite sides thereof are coated with silicon dioxide and titanium dioxide.

9. The reflective liquid crystal light valve of claim 6 wherein said transparent conductive counter-electrode comprises a layer of material having anti-reflective coatings on both surfaces thereof.

10. The reflective liquid crystal light valve of claim 6 wherein said transparent conductive counter-electrode comprises a layer of fused silicon having a layer of indium tin oxide formed on opposite sides thereof thereon, and wherein said layers of indium tin oxide has anti-reflective coatings on outer surfaces thereof.

11. The reflective liquid crystal light valve of claim 6 wherein said transparent conductive counter-electrode comprises a substrate, a primary conductive layer, and first and second pairs of anti-reflective layers positioned on either side of said primary conductive layer, one layer of each pair of anti-reflective layers having a relatively high index of refraction and the other layer of such pair having a relatively low index of refraction.

12. The reflective liquid crystal light valve of claim 11 wherein said primary conductive layer is formed of indium tin oxide.

13. The reflective liquid crystal light valve of claim 11 wherein said primary conductive layer is formed of tin oxide.

14. The reflective liquid crystal light valve of claim 11 wherein said primary conductive layer is formed of indium tin oxide, one of the layers of said first pair of anti-reflective layers is made of tin oxide and the other layer of said first pair of anti-reflective layers is made of silicon dioxide.

15. The reflective liquid crystal light valve of claim 11 wherein said primary conductive layer is formed of indium tin oxide, and the layers of said first pair are respectively made of indium tin oxide and silicon dioxide.

16. The reflective liquid crystal light valve of claim 11 wherein said primary conductive layer is formed of indium tin oxide, and the layers of said pair of anti-reflective layers are respectively made of indium tin oxide and magnesium fluoride.

17. The reflective liquid crystal light valve of claim 11 wherein said primary conductive layer is formed of indium tin oxide, and the layers of said pair of anti-reflective layers are made of titanium dioxide and silicon dioxide, respectively.

18. The reflective liquid crystal light valve of claim 6 wherein said counter-electrode has a plurality of pairs of anti-reflective coatings on both sides thereof, and wherein one layer of each pair has a higher index of refraction than the other layer of such pair.

19. The reflective liquid crystal light valve of claim 6 wherein said counter-electrode has an index of refraction higher than the index of refraction of each of said liquid crystal mixture and said window, and said counter-electrode is coated with pairs of anti-reflective layers having alternately high and low indices of refraction.

20. The apparatus of claim 6 wherein said means for decreasing reflection reduces reflection to less than 0.2% for light having wavelengths from 410–680 nm.

21. In a reflective liquid crystal light valve apparatus including a window layer for receiving an incoming light beam, a transparent conductive layer, a reflective layer, a liquid crystal layer interposed between the reflective and transparent conductive layers, said transparent conductive layer being interposed between said liquid crystal layer and said window layer and having interference fringes due to reflection at a first interface between said window layer and said transparent conductive layer and at a second interface between said transparent conductive layer and said liquid crystal layer, and a line spectrum light source for transmitting light through said window and said transparent conductive layer and said liquid crystal layer to said reflective layer, to be reflected back through said liquid crystal layer, said transparent conductive layer and said window layer, an improved reflective liquid crystal light valve comprising:

means, located adjacent opposite sides of said transparent conductive layer, for decreasing reflection of light from said first and second interfaces to less than 0.3% for light having wavelengths from 400–700 nm, wherein said means for decreasing comprises five pairs of anti-reflection layers interposed between said transparent conductive layer and said window layer and said transparent conductive layer and said liquid crystal.

22. The apparatus of claim 21 wherein said means for decreasing reflection reduces reflection to less than 0.05% for light having wavelengths from 400–700 nm.

* * * * *